US012489183B2

(12) United States Patent
Pan et al.

(10) Patent No.: US 12,489,183 B2
(45) Date of Patent: Dec. 2, 2025

(54) PHASE SHIFTER AND ELECTRONIC DEVICE

(71) Applicant: BOE TECHNOLOGY GROUP CO., LTD., Beijing (CN)

(72) Inventors: Cheng Pan, Beijing (CN); Shiqiao Zhang, Beijing (CN); Jia Fang, Beijing (CN); Feng Qu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/028,021

(22) PCT Filed: May 27, 2022

(86) PCT No.: PCT/CN2022/095477
§ 371 (c)(1),
(2) Date: Mar. 23, 2023

(87) PCT Pub. No.: WO2023/225983
PCT Pub. Date: Nov. 30, 2023

(65) Prior Publication Data

US 2024/0297427 A1 Sep. 5, 2024

(51) Int. Cl.
*H01P 1/18* (2006.01)
*H01P 1/203* (2006.01)
*H01Q 1/22* (2006.01)

(52) U.S. Cl.
CPC ................ *H01P 1/184* (2013.01); *H01P 1/18* (2013.01); *H01P 1/20345* (2013.01); *H01Q 1/22* (2013.01)

(58) Field of Classification Search
CPC ......... H01P 1/18; H01P 1/184; H01P 1/20345
(Continued)

(56) References Cited

U.S. PATENT DOCUMENTS

2013/0076453 A1 3/2013 Lai et al.
2020/0343634 A1* 10/2020 Wang ........................ H01P 5/12

FOREIGN PATENT DOCUMENTS

CN 110518311 A 11/2019
CN 111293425 A 6/2020
(Continued)

OTHER PUBLICATIONS

Dai et al., "A Beam-steering Array Using Liquid Crystal Phase Shifter," IEEE Xplore, 2016.
(Continued)

*Primary Examiner* — Rakesh B Patel
(74) *Attorney, Agent, or Firm* — HOUTTEMAN LAW LLC

(57) ABSTRACT

A phase shifter and an electronic device are provided and belong to the field of communication technology. The phase shifter includes opposite first and second substrates; a tunable dielectric layer therebetween. The first substrate includes a first dielectric substrate; first and second transmission lines on a side of the first dielectric substrate close to the tunable dielectric layer; the first transmission line includes a first main line and at least one first branch connected to a side of an extending direction thereof; the second transmission line includes a second main line and at least one second branch connected to a side of an extending direction thereof; the first and second main lines are arranged side by side with a first gap therebetween. The second substrate includes a second dielectric substrate and a first electrode layer on a side of the second dielectric substrate close to the tunable dielectric layer.

19 Claims, 4 Drawing Sheets

(58) Field of Classification Search
USPC ....... 333/141, 144, 156, 202, 204, 236, 238, 333/245
See application file for complete search history.

(56) References Cited

FOREIGN PATENT DOCUMENTS

| | | | |
|---|---|---|---|
| CN | 112448105 | A | 3/2021 |
| CN | 113178700 | A | 7/2021 |
| CN | 113611991 | A | 11/2021 |
| CN | 113659333 | A | 11/2021 |
| CN | 114122649 | A | 3/2022 |
| JP | 2005303341 | A | 10/2005 |
| JP | 2021101511 | A | 7/2021 |
| WO | WO 2020174069 | A1 | 9/2020 |

OTHER PUBLICATIONS

Chang, "Research on the design method of tunable liquid crystal phase shifters with filtering functions," Doctoral Dissertation, 2020. pp. 80-98, Harbin Inst. of Technology, Harbin, Heilongjiang, China.

* cited by examiner

PHASE SHIFTER AND ELECTRONIC DEVICE

TECHNICAL FIELD

The present disclosure relates to the field of communication technology, and in particular to a phase shifter and an electronic device.

BACKGROUND

In an existing liquid crystal phase shifter, periodic patch capacitors are introduced on an assembled upper glass substrate, and a variable capacitor is used to adjust a voltage difference loaded on opposite surfaces of two metal plates to drive liquid crystal molecules to rotate, so as to obtain different characteristics of the liquid crystal material, and a corresponding capacitance value is accordingly variable.

SUMMARY

The present invention is directed to at least one of the problems in the prior art, and provides a phase shifter and an electronic device.

In a first aspect, an embodiment of the present disclosure provides a phase shifter, including a first substrate and a second substrate opposite to each other, and a tunable dielectric layer between the first substrate and the second substrate; the first substrate includes a first dielectric substrate, and a first transmission line and a second transmission line on a side of the first dielectric substrate close to the tunable dielectric layer; the first transmission line includes a first main line and at least one first branch connected to the first main line on a side of an extending direction of the first main line; the second transmission line includes a second main line and at least one second branch connected to the second main line on a side of an extending direction of the second main line and arranged on a side of the second main line away from the first main line; the first main line and the second main line are arranged side by side with a first gap defined therebetween; and the second substrate includes a second dielectric substrate and a first electrode layer on a side of the second dielectric substrate close to the tunable dielectric layer.

In some embodiments, the first electrode layer is provided with a first opening therein, and an orthographic projection of the first opening on the first dielectric substrate and an orthographic projection of the first gap on the first dielectric substrate at least partially overlap each other.

In some embodiments, the first opening has a width which is not greater than that of the first gap.

In some embodiments, the first transmission line and the second transmission line are sequentially on a side of the first dielectric substrate close to the tunable dielectric layer, and an interlayer insulating layer is between layers where the first transmission line and the second transmission line are located.

In some embodiments, the at least one first branch and the at least one second branch are in a one-to-one correspondence with each other.

In some embodiments, the at least one first branch includes a plurality of first branches, an region where an orthographic projection of each first branch on the first dielectric substrate overlaps an orthographic projection of the first electrode layer on the first dielectric substrate is a first region; the at least one second branch includes a plurality of second branches, an region where an orthographic projection of each second branch on the first dielectric substrate overlaps the orthographic projection of the first electrode layer on the first dielectric substrate is a second region; and areas of at least two first regions are different from each other; and/or areas of at least two second regions are different from each other.

In some embodiments, the areas of the at least two first regions are different from each other, lengths of at least two first branches are different from each other, and/or widths of the at least two first branches are different from each other; and the areas of the at least two second regions are different from each other, lengths of at least two second branches are different from each other, and/or widths of the at least two second branches are different from each other.

In some embodiments, every two adjacent first branches have a first distance therebetween, and every two adjacent second branches have a second distance therebetween; and at least two first distances have different values; and/or at least two second distances have different values.

In some embodiments, a first distance between centers of any two adjacent first branches connected to a middle region of the first main line is not greater than that between centers of any two adjacent first branches connected to an edge region of the first main line; and/or a second distance between centers of any two adjacent second branches connected to a middle region of the second main line is not greater than that between centers of any two adjacent second branches connected to an edge region of the second main line.

In some embodiments, every two first branches are grouped; for each group of first branches, one first branch, with a connection node between the first branch and the first main line being closer to a midpoint of the first main line, has a width greater than the other first branch; and/or every two second branches are grouped; for each group of second branches, one second branch, with a connection node between the second branch and the second main line being closer to a midpoint of the second main line, has a width greater than the other second branch.

In some embodiments, a connection node between each first branch and the first main line is a first node, and a connection node between each second branch and the second main line is a second node; the plurality of first branches are divided into a plurality of first branch units, and the plurality of second branches are divided into a plurality of second branch units; for each first branch unit, a first coordinate system is established by taking a straight line where the first main line is located as a first horizontal axis and a straight line where a long side of each first branch is located as a first longitudinal axis; the first horizontal axis represents a distance $X_1$ from the origin of the first coordinate system to the first node, the first longitudinal axis represents a length $Y_{i1}$ of the first branch, and $X_1$ is an elementary function with respect to $Y_{i1}$; the elementary function includes any one of a sine function, a cosine function, a logarithmic function, and an exponential function; and/or for each second branch unit, a second coordinate system is established by taking a straight line where the second main line is located as a second horizontal axis and a straight line where a long side of each second branch is located as a second longitudinal axis; the second horizontal axis represents a distance $X_2$ from the origin of the second coordinate system to the second node, the second longitudinal axis represents a length $Y_{i2}$ of the second branch, and $X_2$ is an elementary function with respect to $Y_{i2}$; the elementary function includes any one of a sine function, a cosine function, a logarithmic function, and an exponential function.

In some embodiments, a connection node between each first branch and the first main line is a first node, and a connection node between each second branch and the second main line is a second node; the plurality of first branches are divided into a plurality of first branch units, and the plurality of second branches are divided into a plurality of second branch units; for each first branch unit, a third coordinate system is established by taking a straight line where the first main line is located as a third horizontal axis and a straight line perpendicular to the first main line as a third longitudinal axis; the third horizontal axis represents a distance $X_3$ from the origin of the third coordinate system to the first node, the third longitudinal axis represents a width $W_{i1}$ of the first branch, and $X_3$ is an elementary function with respect to $W_{i1}$; the elementary function includes any one of a sine function, a cosine function, a logarithmic function, and an exponential function; and/or for each second branch unit, a fourth coordinate system is established by taking a straight line where the second main line is located as a fourth horizontal axis and a straight line perpendicular to the second main line as a fourth longitudinal axis; the fourth horizontal axis represents a distance $X_4$ from the origin of the fourth coordinate system to the second node, the fourth longitudinal axis represents a width $W_{i2}$ of the second branch, and $X_4$ is an elementary function with respect to $W_{i2}$; the elementary function includes any one of a sine function, a cosine function, a logarithmic function, and an exponential function.

In some embodiments, the at least one first branch includes a plurality of first branches, an region where an orthographic projection of each first branch on the first dielectric substrate overlaps an orthographic projection of the first electrode layer on the first dielectric substrate is a first region; the at least one second branch includes a plurality of second branches, an region where an orthographic projection of each second branch on the first dielectric substrate overlaps the orthographic projection of the first electrode layer on the first dielectric substrate is a second region; and areas of at least two first regions are equal to each other; and/or areas of at least two second regions are equal to each other.

In some embodiments, the at least one first branch includes a plurality of first branches; the at least one second branch includes a plurality of second branches; lengths of the plurality of first branches are equal to each other; and/or widths of the plurality of first branches are equal to each other; and lengths of the plurality of second branches are equal to each other, and/or widths of the plurality of second branches are equal to each other.

In some embodiments, the lengths of the plurality of first branches are equal to each other; the widths of the plurality of first branches are equal to each other; the lengths of the plurality of second branches are equal to each other, and the widths of the plurality of second branches are equal to each other, centers of every two adjacent first branches have a first distance therebetween, and centers of every two adjacent second branches have a second distance therebetween; and values of the first distances are equal to each other; and/or values of the second distances are equal to each other.

In some embodiments, a connection node between each first branch and the first main line is a first node, and a connection node between each second branch and the second main line is a second node; the plurality of first branches are divided into a plurality of first branch units, and the plurality of second branches are divided into a plurality of second branch units; for each first branch unit, a first coordinate system is established by taking a straight line where the first main line is located as a first horizontal axis and a straight line where a long side of each first branch is located as a first longitudinal axis; the first horizontal axis represents a distance $X_1$ from the origin of the first coordinate system to the first node, the first longitudinal axis represents a length $Y_{i1}$ of the first branch, and $X_1$ is an elementary function with respect to $Y_{i1}$; the elementary function includes any one of a sine function, a cosine function, a logarithmic function, and an exponential function; and/or for each second branch unit, a second coordinate system is established by taking a straight line where the second main line is located as a second horizontal axis and a straight line where a long side of each second branch is located as a second longitudinal axis; the second horizontal axis represents a distance $X_2$ from the origin of the second coordinate system to the second node, the second longitudinal axis represents a length $Y_{i2}$ of the second branch, and $X_2$ is an elementary function with respect to $Y_{i2}$; the elementary function includes any one of a sine function, a cosine function, a logarithmic function, and an exponential function.

In some embodiments, the at least one first branch includes a plurality of first branches; the at least one second branch includes a plurality of second branches; each of the plurality of first branches and the plurality of second branches includes a first end and a second end opposite to each other, the first ends of the first branches are connected to the first main line, the first ends of the second branches are connected to the second main line; the plurality of first branches are divided into a plurality of first branch units, and the plurality of second branches are divided into a plurality of second branch units; a sharp corner is formed by a connection line successively connecting the second ends of the plurality of first branches in each first branch unit; and a sharp corner is formed by a connection line successively connecting the second ends of the plurality of second branches in each second branch unit.

In some embodiments, each first branch and the corresponding second branch have a same length and a same width.

In some embodiments, the first transmission line and the second transmission line are symmetrical with respect to an extension line of a perpendicular bisector of a wide side of the first opening as a symmetry axis.

In some embodiments, the at least one first branch includes a plurality of first branches; the at least one second branch includes a plurality of second branches; each first branch and the corresponding second branch have different lengths; and for all the first branches and all the second branches, a sum of the lengths of each first branch and the corresponding second branch is identical.

In some embodiments, the tunable dielectric layer includes a liquid crystal layer.

In a second aspect, an embodiment of the present disclosure provides an electronic device, which includes the phase shifter in any one of the above embodiments.

DETAIL DESCRIPTION OF EMBODIMENTS

In order to enable one of ordinary skill in the art to better understand the technical solutions of the present disclosure, the present invention will be described in further detail with reference to the accompanying drawings and the detailed description.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

Figure 1:
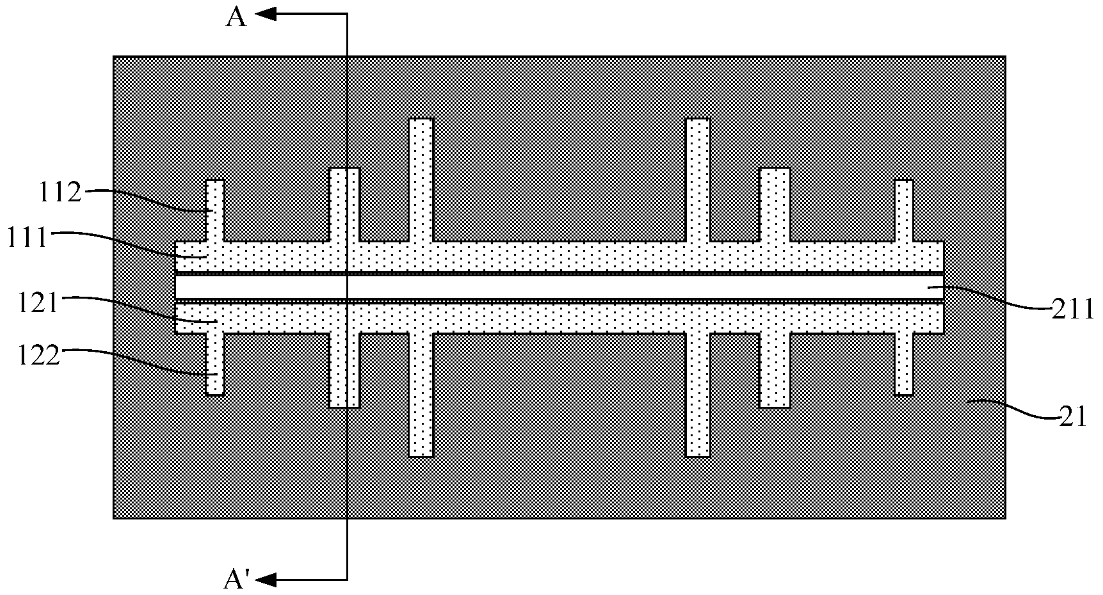
FIG. 1 is a top view of a phase shifter according to an embodiment of the present disclosure.
Figure 2:
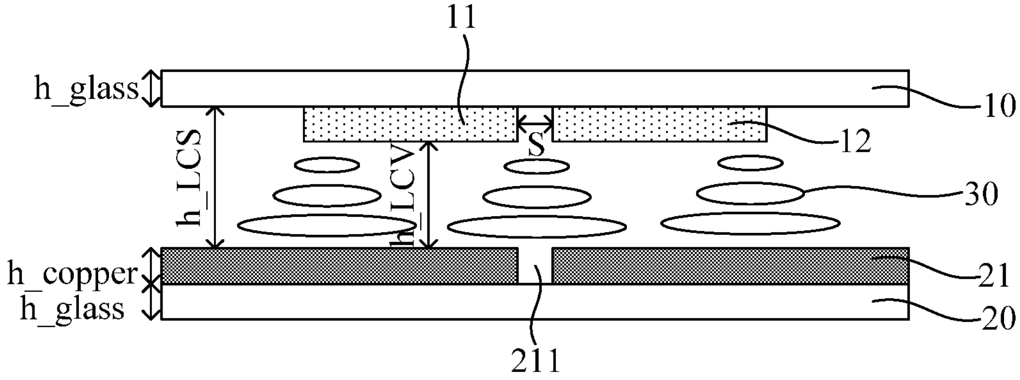
FIG. 2 is a cross-sectional view taken along a line A-A' of FIG. 1.
Figure 3:
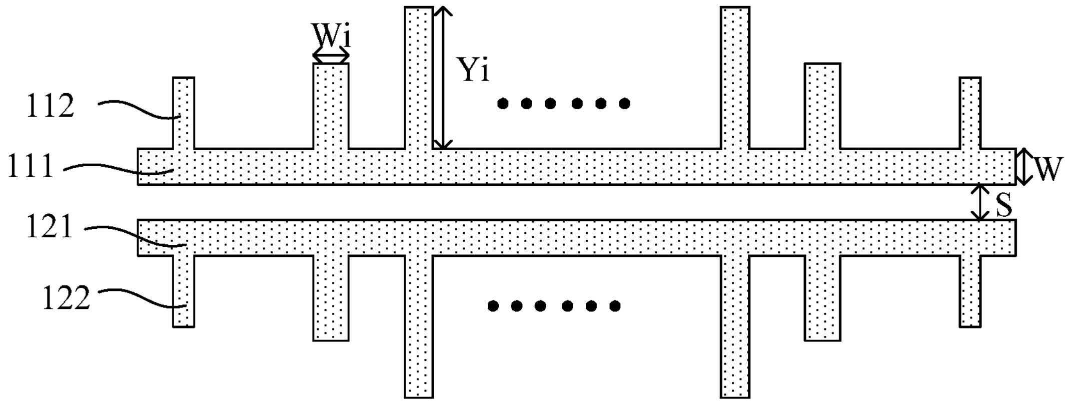
FIG. 3 is a top view of a first transmission line and a second transmission line according to a first example of an embodiment of the present disclosure.
Figure 4:
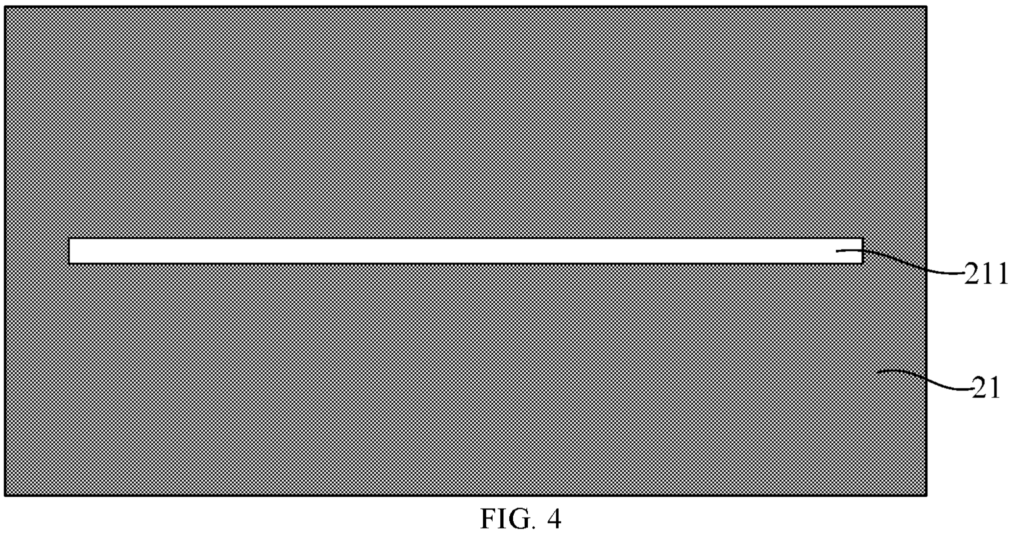
FIG. 4 is a top view of a first electrode layer according to an embodiment of the present disclosure.

In a first aspect, FIG. 1 is a top view of a phase shifter according to an embodiment of the present disclosure. FIG. 2 is a cross-sectional view taken along a line A-A' of FIG. 1. FIG. 3 is a top view of a first transmission line 11 and a second transmission line 12 according to a first example of an embodiment of the present disclosure. FIG. 4 is a top view of a first electrode layer 21 according to an embodiment of the present disclosure. As shown in FIGS. 1 to 4, an embodiment of the present disclosure provides a phase shifter, including a first substrate and a second substrate opposite to each other, and a tunable dielectric layer disposed between the first substrate and the second substrate. The first substrate includes a first dielectric substrate 10, and a first transmission line 11 and a second transmission line 12 which are arranged on a side of the first dielectric substrate 10 close to the tunable dielectric layer. The first transmission line 11 includes a first main line 111 and at least one first branch 112; the at least one first branch 112 is connected to the first main line 111 on a side of an extending direction of the first main line 111. The second transmission line 12 includes a second main line 121 and at least one second branch 122; the at least one second branch 122 is connected to the second main line 121 on a side of an extending direction of the second main line 121. The first main line 111 and the second main line 121 are arranged side by side with a first gap defined therebetween. The second substrate includes a second dielectric substrate 20 and a first electrode layer 21 arranged on a side of the second dielectric substrate 20 close to the tunable dielectric layer.

The first electrode layer 21 includes, but is not limited to, a ground electrode layer, that is, the first electrode layer 21 may be grounded; the tunable dielectric layer includes, but is not limited to, a liquid crystal layer. In the embodiment of the present disclosure, as an example, the first electrode layer 21 is grounded, and the tunable dielectric layer is a liquid crystal layer.

It should be noted that in FIG. 3, the at least one first branch 112 includes a plurality of first branches 112 and the at least one second branch 122 includes a plurality of second branches 122, as an example. Alternatively, it should be understood that in the embodiment of the present disclosure, each of the number of the at least one first branch 112 and the number of the at least one second branch 122 may be one. In FIG. 3, the extending directions of the first main line 111 and the second main line 121 are the same. Alternatively, the extending directions of the first main line 111 and the second main line 121 may be substantially the same in the embodiment of the present disclosure, that is, they do not intersect with each other but have an angle therebetween of not more than 5°. In FIG. 3, an extending direction of each first branch 112 is perpendicular to the extending direction of the first main line 111, and an extending direction of each second branch 122 is perpendicular to the extending direction of the second main line 121. Alternatively, in the embodiment of the present disclosure, the extending direction of each first branch 112 and the extending direction of the first main line 111 may also be substantially perpendicular to each other, that is, an angle between the extending direction of each first branch 112 and the extending direction of the first main line 111 is in a range from about 85° to 95°. Similarly, the extending direction of each second branch 122 and the extending direction of the second main line 121 may also be substantially perpendicular to each other, that is, an angle between the extending direction of each second branch 122 and the extending direction of the second main line 121 is in a range from about 85° to 95°.

In addition, a length (or a long side) and a width (or a wide side) of A are relative concepts, and in the embodiment of the present disclosure, the larger one of the length and the width is referred to as a length, and the smaller one is referred to as a width. In the embodiment of the present disclosure, the extending direction of the first main line 111 is a length direction of the first main line 111; the extending direction of the second main line 121 is a length direction of the second main line 121; the extending direction of the first branch 112 is a length direction of the first branch 112; the extending direction of the second branch 122 is a length direction of the second branch 122.

The phase shifter according to the embodiment of the present disclosure uses two transmission lines, that is, includes the first transmission line 11 and the second transmission line 12. By applying a voltage to the first transmission line 11 and the second transmission line 12, an electric field is formed between the first branch 112 of the first transmission line 11 and the first electrode layer 21, and an electric field is formed between the second branch 122 of the second transmission line 12 and the first electrode layer 21, so that liquid crystal molecules in the liquid crystal layer are rotated under the action of the electric fields, thereby changing a dielectric constant of the liquid crystal layer, and changing a phase of a transmitted radio frequency signal. The coupling between the first main line 111 of the first transmission line 11 and the second main line 121 of the second transmission line 12 spreads a bandwidth of the radio frequency signal.

In some examples, the first electrode layer 21 is provided with a first opening 211 therein, and an orthographic projection of the first opening 211 on the first dielectric substrate 10 and an orthographic projection of the first gap on the first dielectric substrate 10 at least partially overlap each other. In the embodiment of the present disclosure, the first electrode layer 21 is provided with the first opening 211 therein, and the first opening 211 is located at a position corresponding to the first gap between the first main line 111 and the second main line 121, that is, the orthographic projection of the first opening 211 on the first dielectric substrate 10 and the orthographic projection of the first gap on the first dielectric substrate 10 at least partially overlap each other, so that fringing fields formed between the first main line 111 and the first electrode layer 21 and between the second main line 121 and the first electrode layer 21 can be effectively reduced, which avoids that the precision of adjusting a phase of the radio frequency signal by the phase shifter is influenced due to ineffective rotation of the liquid crystal molecules of the liquid crystal layer. Alternatively, the first electrode layer 21 may be a whole layer structure, and the phase shifter having this structure is simpler.

Further, when the first opening 211 is provided in the first electrode layer 21, a width of the first opening 211 is not greater than a width of the first gap. For example: the orthographic projection of the first opening 211 on the first dielectric substrate 10 is located in the orthographic projection of the first gap on the first dielectric substrate 10. In FIG. 1, the width of the first opening 211 is equal to the width of the first gap, as an example, which does not limit the scope of the embodiments of the present disclosure. The width of the first opening 211 is smaller than the width of the first gap, in order to avoid that the tunable capacitors formed between the first electrode layer 21 and the first branch 112 and between the first electrode layer 21 and the second branch 122 are influenced due to the presence of the opening in the first electrode layer 21, and thus, to avoid that the phase shifting performance of the phase shifter is influenced.

In some examples, the number of the first branches 112 of the first transmission line 11 may be equal to the number of the second branches 122 of the second transmission line 12, and the first branches 112 and the second branches 122 are arranged in a one-to-one correspondence. In this way, the uniformity of the device can be ensured. Alternatively, the number of the first branches 112 and the number of the second branches 122 may be different from each other, and may be specifically set according to the requirements on performance parameters of the phase shifter.

In the embodiment of the present disclosure, a plurality of the first branches 112 of the first transmission line 11 may be included, and may be distributed periodically according to a certain rule, or may be disorderly arranged. Sizes of the first branches 112 may be the same or different. Similarly, a plurality of the second branches 122 of the second transmission line 12 may be included, and may be distributed periodically according to a certain rule, or may be disorderly arranged. Sizes of the second branches 122 may be the same or different. The structure of the phase shifter in the embodiments of the present disclosure will be described with reference to specific examples.

In a first example, referring to FIG. 3, an region where an orthographic projection of each first branch 112 of the first transmission line 11 on the first dielectric substrate 10 overlaps an orthographic projection of the first electrode layer 21 on the first dielectric substrate 10 is a first region; an region where an orthographic projection of each second branch 122 of the second transmission line 12 on the first dielectric substrate 10 overlaps the orthographic projection of the first electrode layer 21 on the first dielectric substrate 10 is a second region. Since the plurality of the first branches 112 and the plurality of the second branches 122 are included, the phase shifter in the embodiment of the present disclosure includes a plurality of first regions and a plurality of second regions. At least two of the plurality of first regions have different areas, and at least two of the plurality of second regions have different areas.

With continued reference to FIG. 3, the orthographic projection of the first electrode layer 21 on the first dielectric substrate 10 covers the orthographic projections of the first branches 112 and the second branches 122 on the first dielectric substrate 10, such that the area of the first region depends on the size of each first branch 112 and the area of the second region depends on the size of each second branch 122. For example; when the areas of the at least two first regions are not equal to each other, the lengths of the at least two first branches 112 are not equal to each other, or the widths of the at least two first branches 112 are not equal to each other, or both the lengths and the widths of the at least two first branches 112 are not equal to each other. When the areas of the at least two second regions are not equal to each other, the lengths of the at least two second branches 122 are not equal to each other, or the widths of the at least two second branches 122 are not equal to each other, or both the lengths and the widths of the at least two second branches 122 are not equal to each other.

Further, the first branch 112 and the second branch 122 corresponding to each other have the same size, that is, the same length and the same width. In this case, the first transmission line 11 and the second transmission line 12 are symmetrically disposed with respect to an extension line of a perpendicular bisector of a wide side of the first opening 211 in the first electrode layer 21 as a symmetry axis.

With continued reference to FIG. 3, centers of every two adjacent first branches 112 have a first distance therebetween, and centers of every two adjacent second branches 122 have a second distance therebetween. At least two first distances have different values. Since the first branches 112 and the second branches 122 are arranged in a one-to-one correspondence, the at least two first distances have different values and at least two second distances have different values. For example; the first main line 111 and the second main line 121 each include a middle region and edge regions on both sides of the middle region. A first distance between centers of any two adjacent first branches 112 connected to the middle region of the first main line 111 is not greater than that between centers of any two adjacent first branches 112 connected to the edge region of the first main line 111. It should be noted that when a plurality of first distances are defined among the centers of the first branches 112 connected to the middle region of the first main line 111, there is no regular rule for values of the plurality of first distances, which may be specifically set according to the simulation result. Meanwhile, when a plurality of first distances are defined among the centers of the first branches 112 connected to the edge region of the first main line 111, there is no regular rule for values of the plurality of first distances, which may be specifically set according to the simulation result. In one example, four centers, which are farthest from the middle region, of the centers of the first branches 112 connected to the edge region of the first main line 111 define two first distances (i.e., two centers for each edge region define one first distance therebetween), and the values of the two first distances may be the largest two of the values of all the first distances. Similarly, a second distance between centers of any two adjacent second branches 122 connected to the middle region of the second main line 121 is not greater than that between centers of any two adjacent second branches 122 connected to the edge region of the second main line 121. The second distances may be provided in a same way as the first distances, and therefore, the description thereof is not repeated herein.

With continued reference to FIG. 3, every two first branches 112 on the first transmission line 11 are grouped. For each group of first branches 112, one first branch 112, with a connection node between the first branch 112 and the first main line 111 being closer to a midpoint of the first main line 111, has a width greater than the other first branch 112. Similarly, every two second branches 122 on the second transmission line 12 are grouped. For each group of second branches 122, one second branch 122, with a connection node between the second branch 122 and the second main line 121 being closer to a midpoint of the second main line 121, has a width greater than the other second branch 122.

Sizes of the components of the phase shifter in FIG. 1 may be set as follows. Assuming that n first branches 112 of the first transmission line 11 and n second branches 122 of the second transmission line 12 are included, n≥2. The first main line 111 of the first transmission line 11 and the second main line 121 of the second transmission line 12 both have a length L and a width W, and a distance between the first main line 111 and the second main line 121 is S. Each first branch 112 and each second branch 122 both have a length $Y_i$, and a width $W_i$; i is in a range from 1 to n. A portion of the liquid crystal layer corresponding to a position where the first branches 112 and the second branches 122 are disposed has a thickness h_LCV; A portion of the liquid crystal layer corresponding to a position where the first branches 112 and the second branches 122 are not disposed and a portion of the first electrode layer 21 corresponding to a position where the first opening is not disposed both have a thickness h_LCS. The first electrode layer 21 has a thickness h_copper. The first dielectric substrate 10 and the second dielectric substrate 20 both have a thickness h_glass. 1 μm≤h_LCS≤100 μm. Preferably, 15 μm≤h_LCS≤15 μm. In this case, the response time of liquid crystals can be effectively improved. 0.2 μm≤h_copper≤5 μm, 100 μm≤h_glass≤10 mm. In one example, h_LCS and h_copper are less than λ/1000; λ is a wavelength corresponding to a central frequency point of the phase shifter. S/h_LCV>0.005; S<λ/100; W<λ/100; L>λ/2; $W_i$<λ/10; $Y_i$<λ/10.

Figure 5:
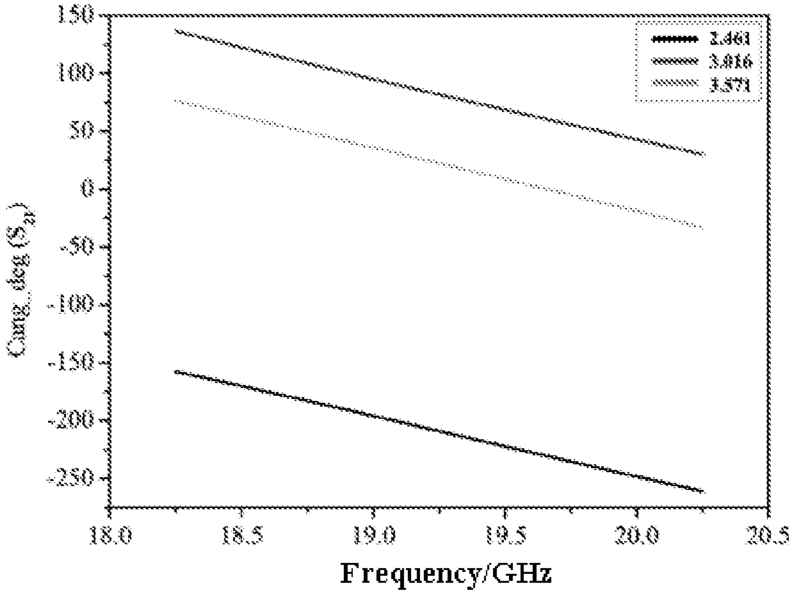
FIG. 5 is a simulation diagram of a phase shifter according to a first example of an embodiment of the present disclosure.

In order to understand the effect of the phase shifter shown in FIG. 3 better, the phase shifter is subjected to simulation experiments, where h_LCS=2 μm and h_copper=0.2 μm, namely, h_LCS and h_copper are both smaller than λ/1000, and the effective dielectric constant εr of liquid crystals of the liquid crystal layer is in a range from 2.461 to 3.571. FIG. 5 is a simulation diagram of a phase shifter according to a first example of an embodiment of the present disclosure. As shown in FIG. 5, the phase shifter has a phase shift of more than 100° at a center frequency $f_0$.

Figure 6:
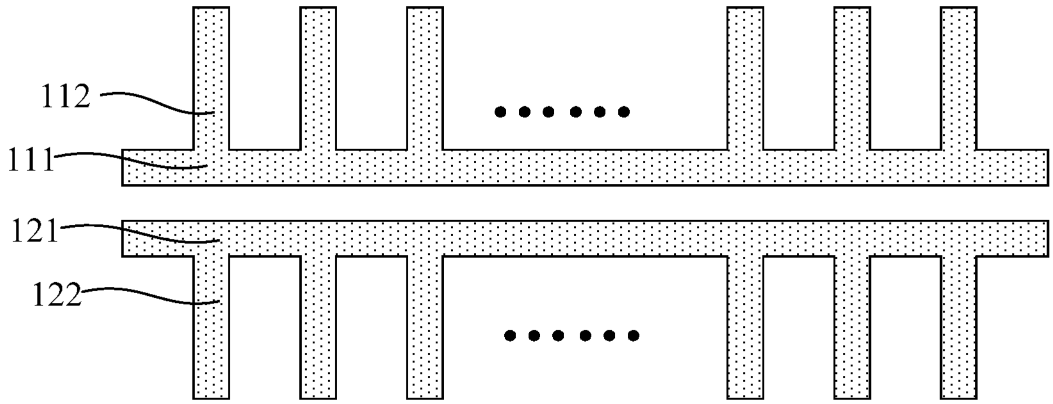
FIG. 6 is a top view of a first transmission line and a second transmission line according to a second example of an embodiment of the present disclosure.

In a second example, FIG. 6 is a top view of a first transmission line 11 and a second transmission line 12 according to a second example of an embodiment of the present disclosure. As shown in FIG. 6, in this example, the first branch 112 and the second branch 122 are simpler in design than those in the first example, and each of the first branch 112 and the second branch 122 has only a same size, that is, each of the length and the width of each first branch 112 is constant, and each of the length and the width of each second branch 122 is constant. That is, the areas of the overlapping regions (first regions) of the orthographic projections of the first branches 112 and the first electrode layer 21 on the first dielectric substrate 10 are all equal to each other; the areas of the overlapping regions (second regions) of the orthographic projections of the second branches 122 and the first electrode layer 21 on the first dielectric substrate 10 are all equal to each other. In this case, the first branches 112 are uniformly distributed and have the same size, the second branches 122 are uniformly distributed and have the same size, so that the phase shifter based on the coupled microstrip lines is easier to be manufactured and has higher fault tolerance in the manufacturing process without degrading the phase shifting performance.

Each first branch 112 and the corresponding second branch 122 have the same size, that is, have the same length and have the same width. In this case, the first transmission line 11 and the second transmission line 12 are symmetrically disposed with respect to an extension line of a perpendicular bisector of a wide side of the first opening 211 in the first electrode layer 21 as a symmetry axis.

The first main line 111 of the first transmission line 11 and the second main line 121 of the second transmission line 12 both have a length L and a width W, and a distance between the first main line 111 and the second main line 121 is S. Each first branch 112 and each second branch 122 both have a length $Y_i$, and a width $W_i$; i is in a range from 1 to n. A portion of the liquid crystal layer corresponding to a position where the first branches 112 and the second branches 122 are disposed has a thickness h_LCV; A portion of the liquid crystal layer corresponding to a position where the first branches 112 and the second branches 122 are not disposed and a portion of the first electrode layer 21 corresponding to a position where the first opening is not disposed both have a thickness h_LCS. The first electrode layer 21 has a thickness h_copper. The first dielectric substrate 10 and the second dielectric substrate 20 both have a thickness h_glass. Values of L, W, S, $Y_i$, $W_i$, h_LCV, h_LCS and h_copper may all be the same as those in the first example, and thus, description thereof is not repeated herein.

Figure 7:
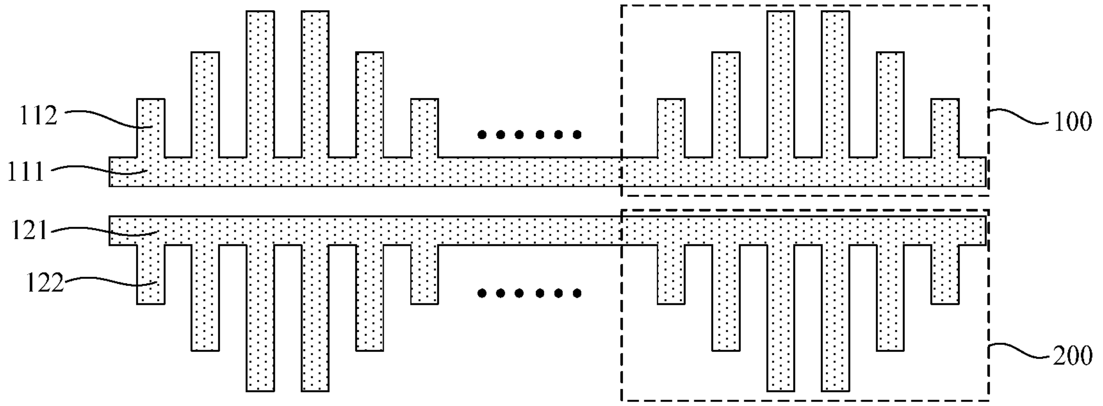
FIG. 7 is a top view of a first transmission line and a second transmission line according to a third example of an embodiment of the present disclosure.

In a third example, FIG. 7 is a top view of a first transmission line 11 and a second transmission line 12 according to a third example of an embodiment of the present disclosure. As shown in FIG. 7, in this example, the first branches 112 are all equal in width, and the second branches 122 are all equal in width. A connection node between each first branch 112 and the first main line 111 is a first node, and a connection node between each second branch 122 and the second main line 121 is a second node; the first branches 112 are divided into a plurality of first branch units 100, and the second branches 122 are divided into a plurality of second branch units 200. In one example, the first branches 112 in the plurality of first branch unit 100 are arranged in the same manner. The second branches 122 in the plurality of second branch units 200 are arranged in the same manner.

Further, for each first branch unit 100, a first coordinate system is established by taking a straight line where the first main line 111 is located as a first horizontal axis and a straight line where a long side of each first branch 112 is located as a first longitudinal axis; the first horizontal axis represents a distance $X_1$ from the origin of the first coordinate system to the first node, the first longitudinal axis represents a length $Y_{i1}$ of the first branch 112, and $X_1$ is an elementary function with respect to $Y_{i1}$; the elementary function includes any one of a sine function, a cosine function, a logarithmic function, and an exponential function. In FIG. 7, as an example, $X_1$ is a sine function with respect to $Y_{i1}$.

Similarly, for each second branch unit 200, a second coordinate system is established by taking a straight line where the second main line 121 is located as a second horizontal axis and a straight line where a long side of each second branch 122 is located as a second longitudinal axis; the second horizontal axis represents a distance $X_2$ from the origin of the second coordinate system to the second node, the second longitudinal axis represents a length $Y_{i2}$ of the second branch 122, and $X_2$ is an elementary function with respect to $Y_{i2}$; the elementary function includes any one of a sine function, a cosine function, a logarithmic function, and an exponential function. In FIG. 7, as an example, $X_2$ is a sine function with respect to $Y_{i2}$.

Further, the value of the first distance between any two adjacent first branches 112 is constant. Similarly, the value of the second distance between any two adjacent second branches 122 is constant. As shown in FIG. 7, the lengths and the distribution of the first branches 112 and the second branches 122 in the phase shifter are periodically changed. In the periodic arrangement, the reflection coefficient S11 can be effectively reduced, and the transmission coefficient S12 can be increased, thereby improving the performance and quality factor of the phase shifter.

Each first branch 112 and the corresponding second branch 122 have the same size, that is, have the same length and have the same width. In this case, the first transmission line 11 and the second transmission line 12 are symmetrically disposed with respect to an extension line of a perpendicular bisector of a wide side of the first opening 211 in the first electrode layer 21 as a symmetry axis.

The first main line 111 of the first transmission line 11 and the second main line 121 of the second transmission line 12 both have a length L and a width W, and a distance between the first main line 111 and the second main line 121 is S. Each first branch 112 and each second branch 122 both have a length $Y_i$, and a width $W_i$; i is in a range from 1 to n. A portion of the liquid crystal layer corresponding to a position where the first branches 112 and the second branches 122 are disposed has a thickness h_LCV; A portion of the liquid crystal layer corresponding to a position where the first branches 112 and the second branches 122 are not disposed and a portion of the first electrode layer 21 corresponding to a position where the first opening is not disposed both have a thickness h_LCS. The first electrode layer 21 has a thickness h_copper. The first dielectric substrate 10 and the second dielectric substrate 20 both have a thickness h_glass. Values of L, W, S, $Y_i$, $W_i$, h_LCV, h_LCS and h_copper may all be the same as those in the first example, and thus, description thereof is not repeated herein.

Figure 8:
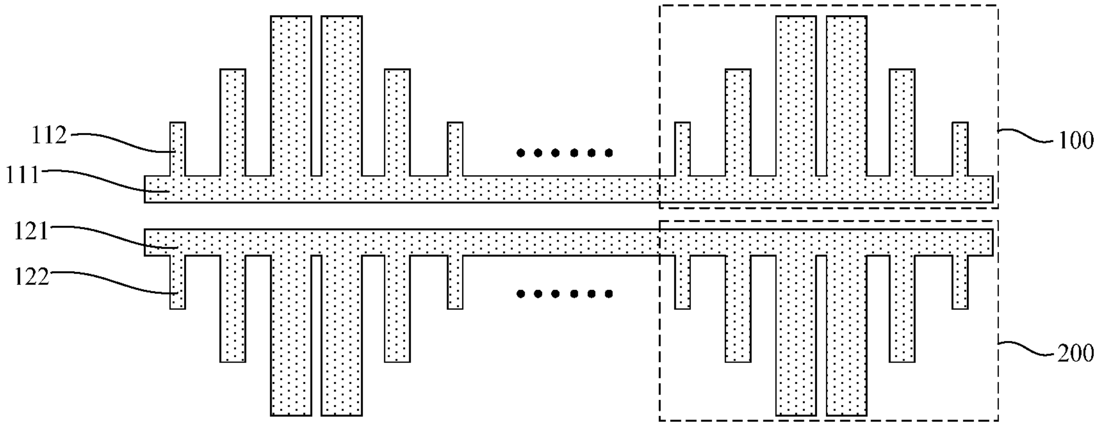
FIG. 8 is a top view of a first transmission line and a second transmission line according to a fourth example of an embodiment of the present disclosure.

In a fourth example, FIG. 8 is a top view of a first transmission line 11 and a second transmission line 12 according to a fourth example of an embodiment of the present disclosure. As shown in FIG. 8, in this example, the lengths of the first branches 112 and the second branches 122 are distributed in the same manner as in the third example. That is, for each first branch unit 100, a first coordinate system is established by taking a straight line where the first main line 111 is located as a first horizontal axis and a straight line where a long side of each first branch 112 is located as a first longitudinal axis; the first horizontal axis represents a distance $X_1$ from the origin of the first coordinate system to the first node, the first longitudinal axis represents a length $Y_{i1}$ of the first branch 112, and $X_1$ is an elementary function with respect to $Y_{i1}$; the elementary function includes any one of a sine function, a cosine function, a logarithmic function, and an exponential function. In FIG. 8, as an example, $X_1$ is a sine function with respect to $Y_{i1}$. Similarly, for each second branch unit 200, a second coordinate system is established by taking a straight line where the second main line 121 is located as a second horizontal axis and a straight line where a long side of each second branch 122 is located as a second longitudinal axis; the second horizontal axis represents a distance $X_2$ from the origin of the second coordinate system to the second node, the second longitudinal axis represents a length $Y_{i2}$ of the second branch 122, and $X_2$ is an elementary function with respect to $Y_{i2}$; the elementary function includes any one of a sine function, a cosine function, a logarithmic function, and an exponential function. In FIG. 8, as an example, $X_2$ is a sine function with respect to $Y_{i2}$.

Unlike the third example, in this example, the widths of the first branches 112 in each first branch unit 100 also satisfy a preset function relationship, that is, the widths of at least two first branches 112 are different from each other. Similarly, the widths of the second branches 122 in each second branch unit 200 also satisfy a preset function relationship, that is, the widths of at least two second branches 122 are different from each other.

For each first branch unit 100, a third coordinate system is established by taking a straight line where the first main line 111 is located as a third horizontal axis and a straight line perpendicular to the first main line 111 as a third longitudinal axis; the third horizontal axis represents a distance $X_3$ from the origin of the third coordinate system to the first node, the third longitudinal axis represents a width $W_{i1}$ of the first branch 112, and $X_3$ is an elementary function with respect to $W_{i1}$; the elementary function includes any one of a sine function, a cosine function, a logarithmic function, and an exponential function.

Similarly, for each second branch unit 200, a fourth coordinate system is established by taking a straight line where the second main line 121 is located as a fourth horizontal axis and a straight line perpendicular to the second main line 121 as a fourth longitudinal axis; the fourth horizontal axis represents a distance $X_4$ from the origin of the fourth coordinate system to the second node, the fourth longitudinal axis represents a width $W_{i2}$ of the second branch 122, and $X_4$ is an elementary function with respect to $W_{i2}$; the elementary function includes any one of a sine function, a cosine function, a logarithmic function, and an exponential function.

Further, even if the widths of at least two first branches 112 in each first branch unit 100 are different from each other, a distance between centers of any two adjacent first branches 112 is constant. Similarly, even if the widths of at least two second branches 122 in each second branch unit 200 are different from each other, a distance between centers of any two adjacent second branches 122 is constant. In some examples, the distance between the centers of any two adjacent first branches 112 and the distance between the centers of any two adjacent second branches 122 are both less than λ/10.

In this example, the lengths and the widths of the first branches 112 in each first branch unit 100 both satisfy the preset function relationship, so that the overlapping regions (first regions) of the orthographic projections of the first branches 112 and the first electrode layer 21 on the first dielectric substrate 10 also satisfy the preset function relationship, that is, the areas of the first branches 112 in each first branch unit 100 are periodically changed. With this arrangement, the adjustable region of the liquid crystal layer can be significantly increased, thereby effectively increasing the phase shift amount.

Each first branch 112 and the corresponding second branch 122 have the same size, that is, have the same length and have the same width. In this case, the first transmission line 11 and the second transmission line 12 are symmetrically disposed with respect to an extension line of a perpendicular bisector of a wide side of the first opening 211 in the first electrode layer 21 as a symmetry axis.

The first main line 111 of the first transmission line 11 and the second main line 121 of the second transmission line 12 both have a length L and a width W, and a distance between the first main line 111 and the second main line 121 is S. Each first branch 112 and each second branch 122 both have a length $Y_i$, and a width $W_i$; i is in a range from 1 to n. A portion of the liquid crystal layer corresponding to a position where the first branches 112 and the second branches 122 are disposed has a thickness h_LCV; A portion of the liquid crystal layer corresponding to a position where the first branches 112 and the second branches 122 are not disposed and a portion of the first electrode layer 21 corresponding to a position where the first opening is not disposed both have a thickness h_LCS. The first electrode layer 21 has a thickness h_copper. The first dielectric substrate 10 and the second dielectric substrate 20 both have a thickness h_glass. Values of L, W, S, $Y_i$, $W_i$, h_LCV, h_LCS and h_copper may all be the same as those in the first example, and thus, description thereof is not repeated herein.

Figure 9:
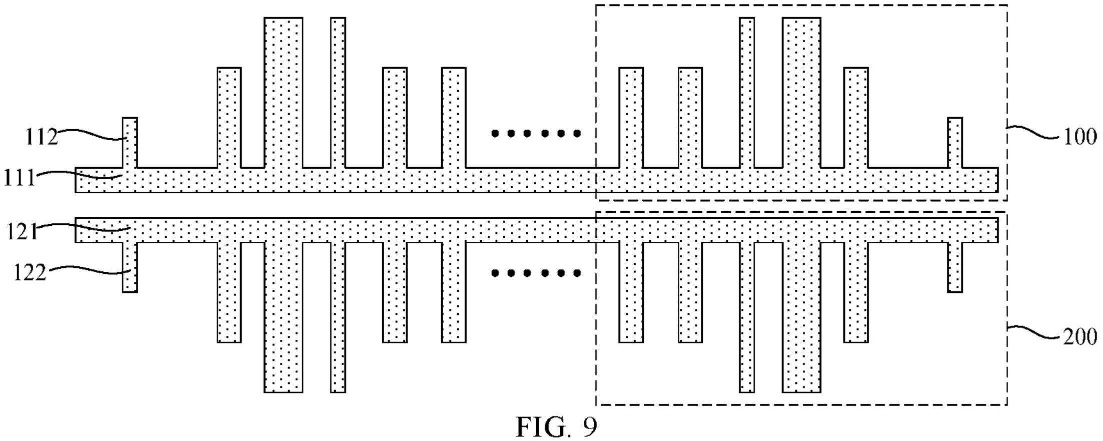
FIG. 9 is a top view of a first transmission line and a second transmission line according to a fifth example of an embodiment of the present disclosure.

In a fifth example, FIG. 9 is a top view of a first transmission line 11 and a second transmission line 12 according to a fifth example of an embodiment of the present disclosure. As shown in FIG. 9, the structure in this example is substantially similar to that in the fourth example, except that the distance between the centers of any two adjacent first branches 112 is the first distance, and in each first branch unit 100, the values of at least two first distances are different from each other. Similarly, the distance between the centers of any two adjacent second branches 122 is the second distance, and in each second branch unit 200, the values of at least two second distances are different from each other. Moreover, in this example, only the lengths of the first branches 112 and the second branches 122 satisfy the preset function distribution, while the widths of the first branches 112 and the second branches 122 are randomly distributed. At this time, the areas of the first branches 112 in each first branch unit 100 are randomly distributed, that is, non-periodically changed; similarly, the areas of the second branches 122 in each second branch unit 200 are randomly distributed, i.e., non-periodically changed. In this case, the first transmission line 11 and the second transmission line 12 may have better transmission and reflection coefficients in a specific frequency band.

The design for the remaining structures of the first transmission line 11 and the second transmission line 12 in this example may be the same as those in the fourth example, and therefore, the description thereof is not repeated here.

Figure 10:
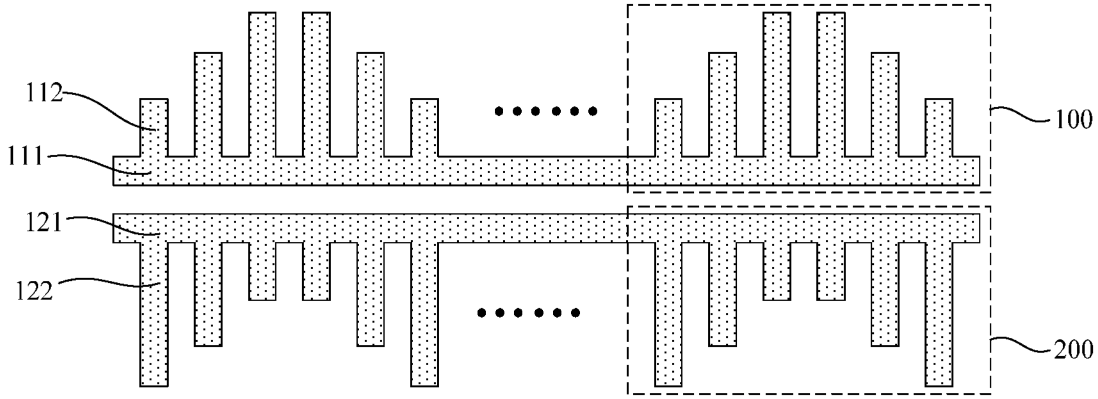
FIG. 10 is a top view of a first transmission line and a second transmission line according to a sixth example of an embodiment of the present disclosure.

In a sixth example, FIG. 10 is a top view of a first transmission line 11 and a second transmission line 12 according to a sixth example of an embodiment of the present disclosure. As shown in FIG. 10, the structure in this example is similar to that in the third example, except that the first transmission line 11 and the second transmission line 12 are not symmetrically disposed with respect to the extension line of the perpendicular bisector of the wide side of the first opening 211 in the first electrode layer 21 as the symmetry axis. That is, each first branch 112 and the corresponding second branch 122 may have different lengths. In this case, the first transmission line 11 and the second transmission line 12 may have better transmission and reflection coefficients in a specific frequency band.

In some examples, a sum of the lengths of each first branch 112 and the corresponding second branch 122 is a constant.

The design for the remaining structures of the first transmission line 11 and the second transmission line 12 in this example may be the same as those in the third example, and therefore, the description thereof is not repeated here.

Only some exemplary structures of the phase shifter are given above, but the phase shifter in the embodiments of the present disclosure is not limited to the above structures. For example; each of the first branches 112 and the second branches 122 includes a first end and a second end that are opposite to each other, the first ends of the first branches 112 are connected to the first main line 111, the first ends of the second branches 122 are connected to the second main line 121. A sharp corner is formed by a connection line successively connecting the second ends of the first branches 112 in each first branch unit 100. Similarly, a sharp corner is formed by a connection line successively connecting the second ends of the second branches 122 in each second branch unit 200.

In the above embodiments of the present disclosure, the first branches 112 and the second branches 122 are both rectangular as an example. In an actual product, alternatively, the first branches 112 and the second branches 122 may be triangular, elliptical, trapezoidal, or the like.

Figure 11:
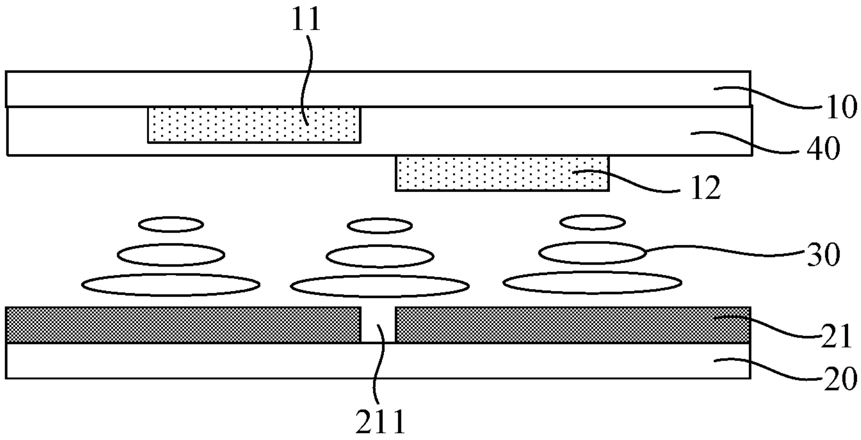
FIG. 11 is a cross-sectional view of another phase shifter according to an embodiment of the present disclosure.

It should be noted that in the above description of the embodiments of the present disclosure, as an example, the first transmission line 11 and the second transmission line 12 are disposed in the same layer for description. When the first transmission line 11 and the second transmission line 12 are disposed in the same layer, they may be formed through the same patterning process, which may effectively reduce the cost, and easily realize the lightweight and thinness of the phase shifter. FIG. 11 is a cross-sectional view of another phase shifter in accordance with an embodiment of the present disclosure. As shown in FIG. 11, in some examples, the first transmission line 11 and the second transmission line 12 may also be arranged in different layers. For example; the second transmission line 12 and the first transmission line 11 are sequentially disposed on a side of the first dielectric substrate 10 close to the liquid crystal layer 30, and an interlayer insulating layer 40 is disposed between layers where the first transmission line 11 and the second transmission line 12 are located. Since the second transmission line 12 is disposed on the side of the first transmission line 11 away from the first dielectric substrate 10, the design size of the first transmission line 11 can be increased, or the design size of the second transmission line 12 can be decreased, so that the capacitor formed by the overlapping of the first branch 112 with the first electrode layer 21 and the capacitor formed by the overlapping of the second branch 122 with the first electrode layer 21 eliminate the adverse effect caused by the interlayer insulating layer 40. Specifically, by taking a group of the first branch 112 and the second branch 122 corresponding to each other as an example, on the premise that the widths of the first branch 112 and the second branch 122 are not changed, a ratio of the length L1 of the first branch 112 to the length L2 of the second branch 122 satisfies L1/L2=1+A/H, A is a distance between the first transmission line 11 and the second transmission line 12 in a cell gap direction (thickness direction), and H is a distance between the second transmission line and the first electrode layer.

In a second aspect, an embodiment of the present disclosure provides an electronic device which includes an antenna; and the antenna includes the phase shifter of any one of the above embodiments. The antenna further includes a transceiver unit, a radio frequency transceiver, a signal amplifier, a power amplifier, and a filtering unit. The antenna may be used as a transmitting antenna or a receiving antenna. The transceiver unit may include a baseband and a receiving terminal, where the baseband provides a signal in at least one frequency band, such as 2G signal, 3G signal, 4G signal, 5G signal, or the like; and transmits the signal in the at least one frequency band to the radio frequency transceiver. After the signal is received by a transparent antenna in the electronic device and is processed by the filtering unit, the power amplifier, the signal amplifier and the radio frequency transceiver (not shown), the antenna may transmit the signal to the receiving terminal (such as an intelligent gateway or the like) in the transceiver unit.

Further, the radio frequency transceiver is connected to the transceiver unit and is configured to modulate the signals transmitted by the transceiver unit or demodulate the signals received by the transparent antenna and then transmit the signals to the transceiver unit. Specifically, the radio frequency transceiver may include a transmitting circuit, a receiving circuit, a modulating circuit, and a demodulating circuit. After the transmitting circuit receives multiple types of signals provided by the baseband, the modulating circuit may modulate the multiple types of signals provided by the baseband, and then transmit the modulated signals to the antenna. The signals received by the transparent antenna are transmitted to the receiving circuit of the radio frequency transceiver, and transmitted by the receiving circuit to the demodulating circuit, and demodulated by the demodulating circuit and then transmitted to the receiving terminal.

Further, the radio frequency transceiver is connected to the signal amplifier and the power amplifier, which are in turn connected to the filtering unit connected to at least one antenna. In the process of transmitting signals by the electronic device, the signal amplifier is used for improving a signal-to-noise ratio of the signals output by the radio frequency transceiver and then transmitting the signals to the filtering unit; the power amplifier is used for amplifying the power of the signals output by the radio frequency transceiver and then transmitting the signals to the filtering unit; the filtering unit specifically includes a duplexer and a filtering circuit, the filtering unit combines signals output by the signal amplifier and the power amplifier and filters noise waves and then transmits the signals to the transparent antenna, and the antenna radiates the signals. In the process of receiving signals by the electronic device, the signals received by the antenna are transmitted to the filtering unit, which filters noise waves in the signals received by the antenna and then transmits the signals to the signal amplifier and the power amplifier, and the signal amplifier gains the signals received by the antenna to increase the signal-to-noise ratio of the signals; the power amplifier amplifies the power of the signals received by the antenna. The signals received by the antenna are processed by the power amplifier and the signal amplifier and then transmitted to the radio frequency transceiver, and the radio frequency transceiver transmits the signals to the transceiver unit.

In some examples, the signal amplifier may include various types of signal amplifiers, such as a low noise amplifier, without limitation.

In some examples, the antenna provided by the embodiments of the present disclosure further includes a power management unit connected to the power amplifier and for providing the power amplifier with a voltage for amplifying the signal.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A phase shifter, comprising a first substrate and a second substrate opposite to each other, and a tunable dielectric layer between the first substrate and the second substrate; wherein the first substrate comprises a first dielectric substrate, and a first transmission line and a second transmission line on a side of the first dielectric substrate close to the tunable dielectric layer; the first transmission line comprises a first main line and at least one first branch connected to the first main line on a side of an extending direction of the first main line; the second transmission line comprises a second main line and at least one second branch connected to the second main line on a side of an extending direction of the second main line and arranged on a side of the second main line away from the first main line; the first main line and the second main line are arranged side by side with a first gap therebetween; and the second substrate comprises a second dielectric substrate and a first electrode layer on a side of the second dielectric substrate close to the tunable dielectric layer;

wherein the first electrode layer is provided with a first opening therein, and an orthographic projection of the first opening on the first dielectric substrate and an orthographic projection of the first gap on the first dielectric substrate at least partially overlap each other.

2. An electronic device, comprising the phase shifter of claim 1.

3. The phase shifter of claim 1, wherein the first opening has a width which is not greater than that of the first gap.

4. The phase shifter of claim 1, wherein the first transmission line and the second transmission line are sequentially on a side of the first dielectric substrate close to the tunable dielectric layer, and an interlayer insulating layer is between layers where the first transmission line and the second transmission line are located.

5. The phase shifter of claim 1, wherein the at least one first branch and the at least one second branch are in a one-to-one correspondence with each other.

6. The phase shifter of claim 1, wherein the at least one first branch comprises a plurality of first branches, a region where an orthographic projection of each first branch on the first dielectric substrate overlaps an orthographic projection of the first electrode layer on the first dielectric substrate is a first region; the at least one second branch comprises a plurality of second branches, a region where an orthographic projection of each second branch on the first dielectric substrate overlaps the orthographic projection of the first electrode layer on the first dielectric substrate is a second region; and areas of at least two first regions of the first regions corresponding to the plurality of first branches are different from each other; and/or areas of at least two second regions of the second regions corresponding to the plurality of second branches are different from each other.

7. The phase shifter of claim 6, wherein the areas of the at least two first regions are different from each other, lengths of at least two first branches corresponding to the at least two first regions are different from each other, and/or widths of the at least two first branches are different from each other; and the areas of the at least two second regions are different from each other, lengths of at least two second branches corresponding to the at least two second regions are different from each other, and/or widths of the at least two second branches are different from each other.

8. The phase shifter of claim 6, wherein every two adjacent first branches have a first distance therebetween, and every two adjacent second branches have a second distance therebetween; and at least two first distances have different values; and/or at least two second distances have different values.

9. The phase shifter of claim 8, wherein a first distance between centers of any two adjacent first branches connected to a middle region of the first main line is not greater than that between centers of any two adjacent first branches connected to an edge region of the first main line; and/or a second distance between centers of any two adjacent second branches connected to a middle region of the second main line is not greater than that between centers of any two adjacent second branches connected to an edge region of the second main line.

10. The phase shifter of claim 6, wherein every two first branches are grouped as a group of first branches; for each group of first branches, one first branch, with a connection node between the one first branch and the first main line being closer to a midpoint of the first main line, has a width greater than the other first branch; and/or every two second branches are grouped as a group of second branches; for each group of second branches, one second branch, with a connection node between the one second branch and the second main line being closer to a midpoint of the second main line, has a width greater than the other second branch.

11. The phase shifter of claim 6, wherein a connection node between each first branch and the first main line is a first node, and a connection node between each second branch and the second main line is a second node; the plurality of first branches are divided into a plurality of first branch units, and the plurality of second branches are divided into a plurality of second branch units;

for each first branch unit, a third coordinate system is established by taking a straight line where the first main line is located as a third horizontal axis and a straight line perpendicular to the first main line as a third longitudinal axis; the third horizontal axis represents a distance $X_3$ from an origin of the third coordinate system to the first node, the third longitudinal axis represents a width $W_{i1}$ of the first branch, and $X_3$ is an elementary function with respect to $W_{i1}$; the elementary function comprises any one of a sine function, a cosine function, a logarithmic function, and an exponential function; and/or for each second branch unit, a fourth coordinate system is established by taking a straight line where the second main line is located as a fourth horizontal axis and a straight line perpendicular to the second main line as a fourth longitudinal axis; the fourth horizontal axis represents a distance $X_4$ from an origin of the fourth coordinate system to the second node, the fourth longitudinal axis represents a width $W_{i2}$ of the second branch, and $X_4$ is an elementary function with respect to $W_{i2}$; the elementary function comprises any one of a sine function, a cosine function, a logarithmic function, and an exponential function.

12. The phase shifter of claim 1, wherein the tunable dielectric layer comprises a liquid crystal layer.

13. The phase shifter of claim 1, wherein the at least one first branch comprises a plurality of first branches, a region where an orthographic projection of each first branch on the first dielectric substrate overlaps an orthographic projection of the first electrode layer on the first dielectric substrate is a first region; the at least one second branch comprises a plurality of second branches, a region where an orthographic projection of each second branch on the first dielectric substrate overlaps the orthographic projection of the first electrode layer on the first dielectric substrate is a second region; and areas of at least two first regions of the first regions corresponding to the plurality of first branches are equal to each other; and/or areas of at least two second regions of the second regions corresponding to the plurality of second branches are equal to each other.

14. The phase shifter of claim 1, wherein the at least one first branch comprises a plurality of first branches; the at least one second branch comprises a plurality of second branches;

lengths of the plurality of first branches are equal to each other; and/or widths of the plurality of first branches are equal to each other; and lengths of the plurality of second branches are equal to each other, and/or widths of the plurality of second branches are equal to each other.

15. The phase shifter of claim 14, wherein the lengths of the plurality of first branches are equal to each other; the widths of the plurality of first branches are equal to each other; the lengths of the plurality of second branches are equal to each other, and the widths of the plurality of second branches are equal to each other, centers of every two adjacent first branches have a first distance therebetween, and centers of every two adjacent second branches have a second distance therebetween; and the first distances for the plurality of first branches are equal to each other; and/or the second distances for the plurality of second branches are equal to each other.

16. The phase shifter of claim 1, wherein the at least one first branch comprises a plurality of first branches, and the at least one second branch comprises a plurality of second branches, a connection node between each first branch and the first main line is a first node, and a connection node between each second branch and the second main line is a second node; the plurality of first branches are divided into a plurality of first branch units, and the plurality of second branches are divided into a plurality of second branch units;

for each first branch unit, a first coordinate system is established by taking a straight line where the first main line is located as a first horizontal axis and a straight line where a long side of each first branch is located as a first longitudinal axis; the first horizontal axis represents a distance $X_1$ from an origin of the first coordinate system to the first node, the first longitudinal axis represents a length $Y_{i1}$ of the first branch, and $X_1$ is an elementary function with respect to $Y_{i1}$; the elementary function comprises any one of a sine function, a cosine function, a logarithmic function, and an exponential function; and/or for each second branch unit, a second coordinate system is established by taking a straight line where the second main line is located as a second horizontal axis and a straight line where a long side of each second branch is located as a second longitudinal axis; the second horizontal axis represents a distance $X_2$ from an origin of the second coordinate system to the second node, the second longitudinal axis represents a length $Y_{i2}$ of the second branch, and $X_2$ is an elementary function with respect to $Y_{i2}$; the elementary function comprises any one of a sine function, a cosine function, a logarithmic function, and an exponential function.

17. The phase shifter of claim 1, wherein each first branch and the corresponding second branch have a same length and a same width; and/or the first transmission line and the second transmission line are symmetrical with respect to an extension line of a perpendicular bisector of a wide side of the first opening as a symmetry axis.

18. A phase shifter, comprising a first substrate and a second substrate opposite to each other, and a tunable dielectric layer between the first substrate and the second substrate; wherein the first substrate comprises a first dielectric substrate, and a first transmission line and a second transmission line on a side of the first dielectric substrate close to the tunable dielectric layer; the first transmission line comprises a first main line and at least one first branch connected to the first main line on a side of an extending direction of the first main line; the second transmission line comprises a second main line and at least one second branch connected to the second main line on a side of an extending direction of the second main line and arranged on a side of the second main line away from the first main line; the first main line and the second main line are arranged side by side with a first gap therebetween; and the second substrate comprises a second dielectric substrate and a first electrode layer on a side of the second dielectric substrate close to the tunable dielectric layer, wherein the at least one first branch comprises a plurality of first branches; the at least one second branch comprises a plurality of second branches; each of the plurality of first branches and the plurality of second branches comprises a first end and a second end opposite to each other, the first ends of the first branches are connected to the first main line, the first ends of the second branches are connected to the second main line;

the plurality of first branches are divided into a plurality of first branch units, and the plurality of second branches are divided into a plurality of second branch units;

a sharp corner is formed by a connection line successively connecting the second ends of the plurality of first branches in each first branch unit; and a second sharp corner is formed by a connection line successively connecting the second ends of the plurality of second branches in each second branch unit.

19. A phase shifter, comprising a first substrate and a second substrate opposite to each other, and a tunable dielectric layer between the first substrate and the second substrate; wherein the first substrate comprises a first dielectric substrate, and a first transmission line and a second transmission line on a side of the first dielectric substrate close to the tunable dielectric layer; the first transmission line comprises a first main line and at least one first branch connected to the first main line on a side of an extending direction of the first main line; the second transmission line comprises a second main line and at least one second branch connected to the second main line on a side of an extending direction of the second main line and arranged on a side of the second main line away from the first main line; the first main line and the second main line are arranged side by side with a first gap therebetween; and the second substrate comprises a second dielectric substrate and a first electrode layer on a side of the second dielectric substrate close to the tunable dielectric layer, wherein the at least one first branch comprises a plurality of first branches; the at least one second branch comprises a plurality of second branches; each first branch and the corresponding second branch have different lengths; and for all the first branches and all the second branches, a sum of the lengths of each first branch and the corresponding second branch is identical.

* * * * *